United States Patent [19]

Leavitt et al.

[11] Patent Number: 5,163,978
[45] Date of Patent: Nov. 17, 1992

[54] DUAL PRODUCT PRESSURE SWING ADSORPTION PROCESS AND SYSTEM

[75] Inventors: Frederick W. Leavitt, Tonawanda; James Smolarek, Boston; Dale A. Lagree, Williamsville, all of N.Y.

[73] Assignee: Praxair Technology, Inc., Danbury, Conn.

[21] Appl. No.: 772,866

[22] Filed: Oct. 8, 1991

[51] Int. Cl.⁵ ............................................. B01D 53/04
[52] U.S. Cl. .......................................... 55/18; 55/26; 55/62; 55/68; 55/75; 55/179; 55/389
[58] Field of Search ............... 55/18, 25, 26, 58, 62, 55/68, 74, 75, 161–163, 179, 387, 389

[56] References Cited

U.S. PATENT DOCUMENTS

| | | | |
|---|---|---|---|
| 3,738,087 | 6/1973 | McCombs | 55/58 |
| 3,796,022 | 3/1974 | Simonet et al. | 55/25 |
| 3,923,477 | 12/1975 | Armond et al. | 55/25 |
| 4,013,429 | 3/1977 | Sircar et al. | 55/33 |
| 4,323,370 | 4/1982 | Leitgeb | 55/18 |
| 4,539,019 | 9/1985 | Koch | 55/21 |
| 4,552,571 | 11/1985 | Dechene | 55/25 X |
| 4,576,614 | 3/1986 | Armond et al. | 55/18 |
| 4,599,094 | 7/1986 | Werner et al. | 55/26 |
| 4,732,577 | 3/1988 | Koizumi et al | 55/18 |
| 4,761,165 | 8/1988 | Stöcker et al. | 55/26 X |
| 4,810,265 | 3/1989 | Lagree et al. | 55/26 |
| 4,83,977 | 3/1989 | Schmidt et al. | 55/26 |
| 4,915,711 | 4/1990 | Kumar | 55/26 |
| 5,026,406 | 6/1991 | Kumar | 55/26 |
| 5,071,453 | 12/1991 | Hradek et al. | 55/26 X |

FOREIGN PATENT DOCUMENTS

| | | | |
|---|---|---|---|
| 01-072908 | 3/1989 | Japan | 55/18 |
| 01-262919 | 10/1989 | Japan | 55/26 |

*Primary Examiner*—Robert Spitzer
*Attorney, Agent, or Firm*—Alvin H. Fritschler

[57] ABSTRACT

By capturing the portion found to contain a high concentration of either oxygen or nitrogen in the non-primary waste stream from a PSA-air separation operation, a high purity second product stream can be obtained.

37 Claims, 2 Drawing Sheets

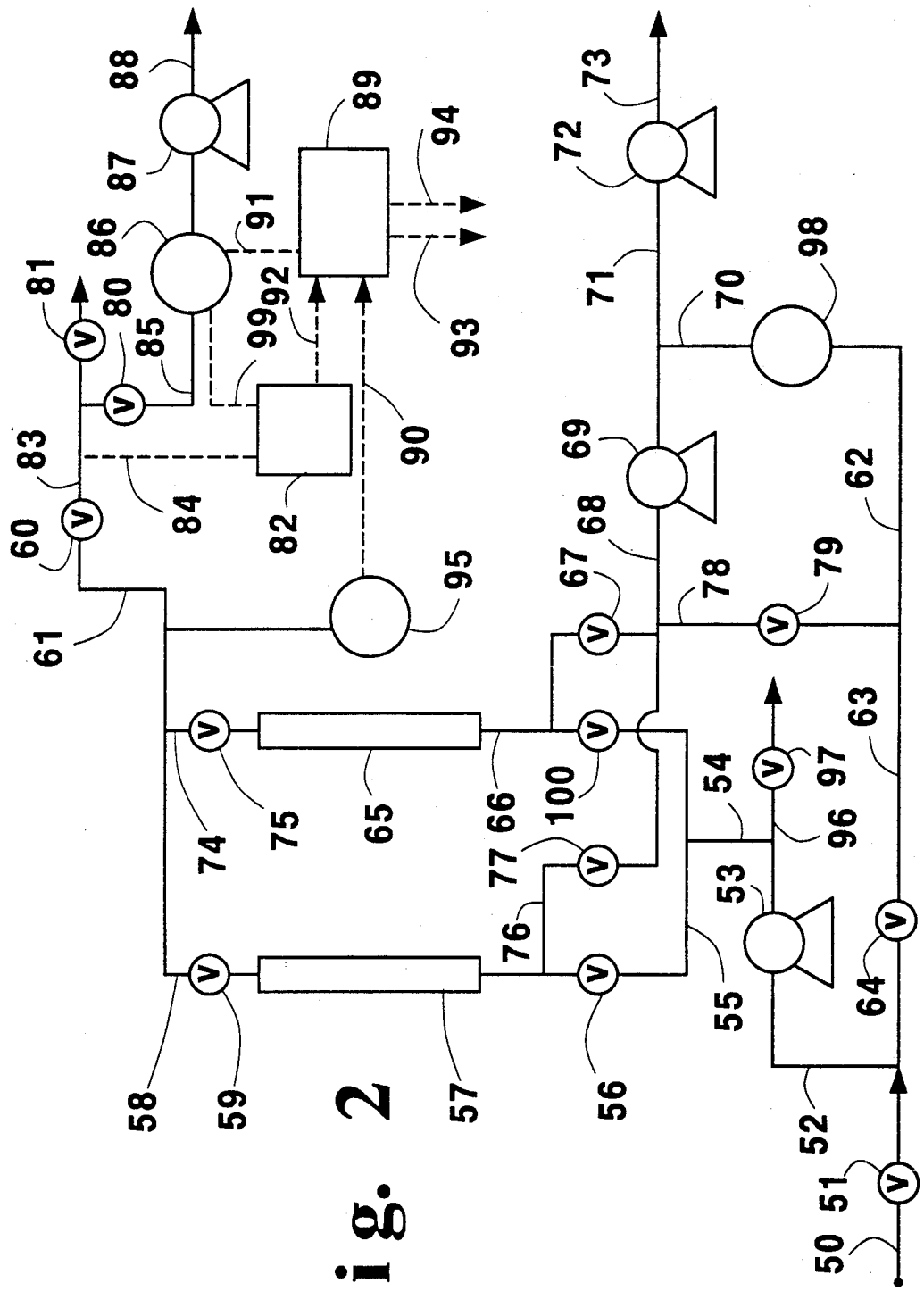

DUAL PRODUCT PRESSURE SWING ADSORPTION PROCESS AND SYSTEM

BACKGROUND OF THE INVENTION

1. Field of the Invention

The invention relates to the separation of gases by pressure swing adsorption processes and systems. More particularly, it relates to dual high purity gas product recovery therefrom.

2. Description of the Prior Art

Pressure swing adsorption (PSA) processes and systems are employed in a wide variety of industrial applications to produce high purity gas streams. In such processing, a feed gas mixture containing a more readily adsorbable component and a less readily adsorbable component are commonly passed to an adsorbent bed capable of selectively adsorbing the more readily adsorbable component at an upper adsorption pressure. The bed is thereafter depressurized to a lower desorption pressure for desorption of the more readily adsorbable component from the adsorbent material and its removal from the bed prior to the introduction of additional quantities of the feed gas mixture to the bed as cyclic adsorption-desorption operations are continued in the bed. Such PSA processing is commonly carried out in multi-bed systems, with each bed undergoing the desired PSA processing sequence on a cyclic basis interrelated to the carrying out of such processing sequence in each other bed in the system.

PSA systems are typically used in industrial applications to produce a single product stream from a given feed gas supply. For highly important air separation purposes, PSA systems achieve the desired separation of oxygen and nitrogen because of the greater selectivity of the adsorbent employed for either oxygen or nitrogen. The adsorptive capacity of any particular adsorbent material increases at higher pressure levels and decreases at lower pressures. In PSA processes and systems for the production of high purity oxygen product, the adsorbent employed may be one having a greater selectivity for either the desired oxygen product or for nitrogen. In systems in which the adsorbent employed is a nitrogen selective material, such as zeolitic molecular sieves, product oxygen is produced as the less readily adsorbable component removed from the bed during the adsorption step at the upper adsorption pressure. When oxygen is the desired product in systems employing an oxygen selective material, such as carbon molecular sieves, product oxygen is produced as the more readily adsorbable component upon the depressurization of the adsorbent bed to its lower desorption pressure. In PSA processes and systems in which nitrogen is the desired product, similar effects will pertain depending on whether the PSA system employs an oxygen or a nitrogen selective adsorbent.

Those skilled in the art will appreciate that PSA systems inherently can not completely separate any given feed stream component from the other components of the feed stream. In general, the PSA separation produces a product gas stream that contains a high percentage of one component together with a small amount of the remaining components. The other stream removed from the PSA system, i.e. the waste stream, will contain all of the incoming feed stream components. The fact that the adsorption system does not completely separate any component of the incoming feed stream from the other components is often the reason why a so-called waste stream exists in PSA processing. Quite frequently, this non-product waste stream does not contain a sufficiently high percentage of any given component to be of use in practical commercial operations. Therefore, this stream is of no significant value to the end user of the gas separation operation.

In the commercially important PSA-air separation technology, it is nevertheless desirable to recover the most prominent component of the waste stream, whether oxygen or nitrogen, as a separate high purity gas stream. Such recovery would serve to enhance the technical and economic feasibility of employing PSA operations in an ever-increasing field of industrially significant applications.

It is an object of the invention therefore, to provide a dual product PSA air separation process and system.

It is another object of the invention to provide a PSA air separation process and system capable of producing either oxygen or nitrogen product, together with a high purity stream comprising the most prominent component of the waste stream therefrom.

With these and other objects in mind, the invention is hereinafter described in detail, the novel features thereof being particularly pointed out in the appended claims.

SUMMARY OF THE INVENTION

The invention appropriately captures the portion of the PSA-air separation waste stream that contains a high concentration of the desired component of the non-primary product waste stream to produce an enriched second product stream. The invention is applicable to both PSA-oxygen and PSA-nitrogen systems.

BRIEF DESCRIPTION OF THE DRAWINGS

The invention is hereinafter described with reference to the accompanying drawings in which:

FIG. 2 is a process flow diagram of a PSA-nitrogen system such as enriched oxygen product recovered from the PSA waste gas.

DETAILED DESCRIPTION OF THE INVENTION

Figure 1:
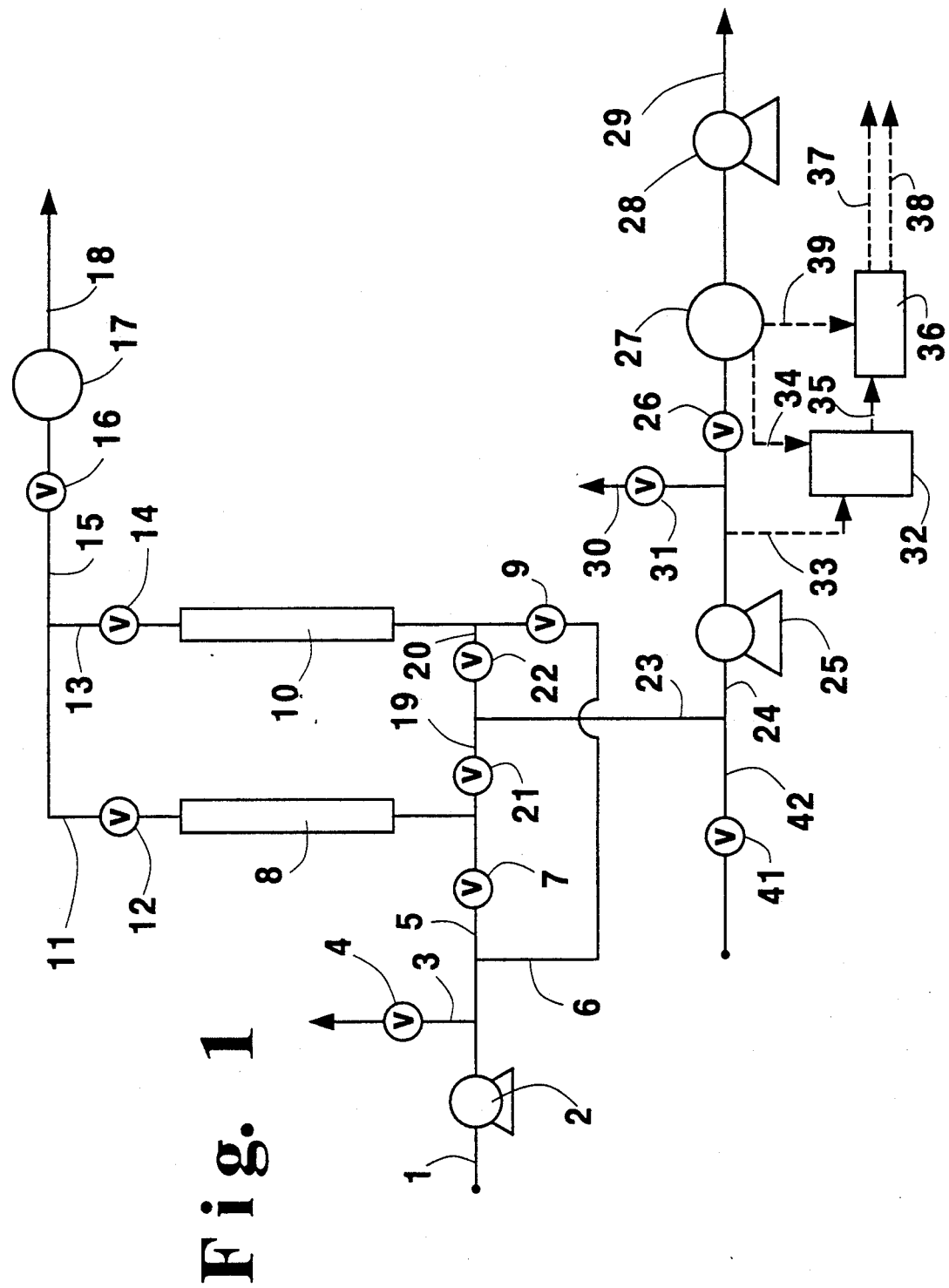
FIG. 1 is a process flow diagram of a PSA-oxygen system with an enriched nitrogen product recovered from the PSA waste gas.

The objects of the invention are accomplished, in PSA-air separation operations by recovering the portion of the waste stream that contains a high concentration of the desired component as an enriched product stream. This approach is feasible because the instantaneous purity of the PSA waste stream is found to vary during the production of said waste stream. As a result, capturing the highest concentration portion of the waste stream results in the obtaining of a high purity stream enriched in the component that otherwise would be discharged with the PSA waste stream. The invention can be practiced for desirable dual product recovery in both PSA-oxygen and PSA-nitrogen systems.

In the practice of the invention, the instantaneous purity of the waste stream is monitored and this stream is captured whenever its purity meets or exceeds a minimum acceptable level. When the purity level of the waste stream is lower than such minimum acceptable level, the waste stream is vented as is customarily the practice with all of the waste gas from PSA-air separation operations. For this purpose, two control valves can be used to direct the flow of the waste stream. The control valves operate directly opposite one another with one valve being used to capture the waste stream, and the other being used to vent this stream. The operation of the valves is based on the instantaneous purity reading of the waste gas.

Since the desired component of the waste gas is recovered in a batch mode, a surge tank is employed to maintain a continuous flow of the desired enriched component as a dual product stream to the end user. Compression of said dual product stream to a desired operating pressure occurs downstream of the surge tank.

With reference to the PSA-oxygen system of FIG. 1, feed air is passed through line 1 and air compressor 2 for passage to a PSA bed at a desired higher adsorption pressure level. Line 3 containing valve 4 is provided to divert compressed air from the system, if desired. Line 1 is divided into two feed lines, 5 and 6, for passage of feed air to each of the two beds in the illustrated PSA system on a cyclic basis. Line 5, containing valve 7, passes to the bottom, or feed end, of adsorbent bed 8, while line 6, containing valve 9, passes to the bottom, or feed end, of adsorbent bed 10. Line 11, containing valve 12 passes from the upper, or product end, of adsorbent bed 8. Line 13, containing valve 14, passes from the upper, or product end, of adsorbent bed 10. Lines 11 and 13 join to form line 15, containing valve 16, that passes to storage tank 17, from which enriched oxygen is recovered through line 18 as a high purity product stream.

At the bottom end of the adsorbent beds, lines 19 and 20 extend from lines 5 and 6, respectively, and contain valves 21 and 22, respectively. Said lines 19 and 20 join to form line 23 that extends to line 24 containing vacuum pump 25, valve 26, storage tank 27, and product compressor 28, from which enriched nitrogen product is recovered through line 29. Line 30, containing valve 31, extends from line 24 between vacuum pump 25 and valve 26.

The purity of the waste gas removed from the adsorbent beds is monitored by purity analyzer 32 in response to input signal 33 taken from line 24 between vacuum pump 25 and the point at which line 30 extends from said line 24. Purity analyzer 32 is also adapted to monitor the gas purity in storage tank 27 by input signal 34. Purity analyzer 32 is adapted to send output signal 35 to control system 36, which is used, through output signals 37 and 38, to appropriately operate valves 31 and 26, respectively, so as to cause PSA waste gas in line 24 to pass through either line 30 or continue to pass through line 24 to storage tank 27. Control system 36 also monitors the amount of enriched gas present in storage tank 27 through input signal 39.

In the operation of the PSA system of FIG. 1, compressed feed air passes through beds 8 and 10 at the upper adsorption pressure on a cyclic basis. Adsorbent beds 8 and 10 comprise equilibrium-type adsorbent material, such as zeolitic molecular sieves, capable of selectively adsorbing nitrogen, while oxygen, or oxygen and argon, passes through the beds and is recovered in line 15 for passage to storage vessel 17 and use as enriched oxygen product. Upon desorption during this portion of the adsorption/desorption PSA processing sequence in each bed, the more readily adsorbable nitrogen, i.e. typical waste gas in PSA-oxygen operations, passes from the lower, feed end of the bed being depressurized to the lower desorption pressure for passage to discharge line 23. When vacuum pump 25 is used to lower the pressure for desorption, nitrogen gas flows through either valve 21 or valve 22 to said discharge line 23 and from there to line 24, to vacuum pump 25, and to line 30 for discharge from the system.

In the practice of the invention, the nitrogen waste stream is not sent continuously to line 30, but is split into two separate streams via control valves 26 and 31. The nitrogen gas that passes through valve 31 and line 30 represents the net waste stream of the process. Nitrogen flow through valve 26 comprises the enriched nitrogen gas produced from the waste stream. The instantaneous purity of the waste stream from the PSA bed undergoing depressurization is monitored by purity analyzer 32, with an output signal from purity analyzer 32 being sent to control system 36 to control the passage of the nitrogen-containing gas to waste through said line 30 containing valve 31 or to storage tank 27 through valve 26, based on the minimum purity acceptable to the end user. When the instantaneous purity is below the acceptable level, the flow is directed through valve 31 and line 30 for discharge from the system as the "net" waste, as by discharge to the atmosphere. When the instantaneous purity is above this level, the flow is directed through valve 26 into storage tank 27. This tank is preferably a bladder type, as opposed to a constant volume, tank in order to minimize the volume thereof needed for purposes of the invention. The storage tank is required to maintain a constant flow of enriched nitrogen product to the end user, since the flow through valve 26 will be discontinuous. Since the waste gas from the PSA beds is at the lower desorption pressure, compression of the recovered enriched nitrogen product stream is typically required. Compressor 28 is used to supply the enriched nitrogen product to the end user at the desired pressure level.

It should be noted that control system 36 also monitors the amount of enriched gas in storage tank 27 by means of input signal 39. At times when the storage tank is not capable of holding any more gas, signal 39 will override purity input signal 33 and cause gas to be vented through valve 31 to waste, regardless of its purity.

As a processing option, control system 36 can be based upon the purity of the gas in storage tank 27 by means of input signal 34, as opposed to the instantaneous purity measured by input signal 33 as indicated above. If the purity level in the tank were above the acceptable level, the user would recover more of the waste gas by simply increasing the time increment in which valve 26 is left open. Likewise, valve 31 would be left closed for a longer period of time so that less gas would be vented as waste. As previously indicated, input signal 39 would override this purity signal if the gas volume in storage tank 27 reached its maximum level.

As a further processing control option, the system can be set up to recover the enriched nitrogen product gas, once the instantaneous purity profile is known, without continuously monitoring either the instantaneous purity or the purity of the gas in the storage tank. In this case, the control valves would be preset in control system 36, based on the required time increment in which the waste gas should be recovered. The control valves would operate based on these present time periods, and their operation would then not be a direct function of either purity. The only signal that would override these preset increments would be signal 39, indicating that storage tank 27 was full.

In a typical waste stream profile, the waste purity of a particular PSA system can be plotted, e.g. as % oxygen present in said stream, against time, as for the particular processing steps employed in the overall adsorption/desorption/repressurization processing sequence. In this regard, it should be noted that PSA processing sequences commonly employ a pressure equalization step in which gas is released from the product end of one bed and is passed to the product end of another bed in the system, i.e. the other bed in the two bed embodiment of FIG. 1, so as to equalize the pressure in the two beds. During such pressure equalization step, neither air compressor 2 nor vacuum pump 25 are required. Therefore, both are in an "unloaded" state during this period of time. Thus, air compressor 2 takes in air through line 1, compresses it to a slightly elevated pressure, and discharges this air to the atmosphere through valve 4. Similarly, vacuum pump 25 takes in air through valve 41 and lines 42 and 24, compresses it to slightly elevated pressure, and discharges this air to the atmosphere through valve 31. Thus, air flows through vacuum pump 25, as opposed to waste gas, during the unload portion of the cycle, i.e. during pressure equalization with a depressurization of one of the beds and during a subsequent pressure equalization with repressurization of that bed at a later portion of the overall processing sequence. The highest oxygen concentration will occur during such unload steps, in which instances the oxygen concentration rises to nearly air quality levels (21%). Once the regeneration portion of the cycle begins following concurrent depressurization—pressure equalization of a particular bed, the oxygen concentration immediately decreases. With regard to the unload steps, it should be noted that the oxygen purity does not reach the 21% level because of the short duration of the unload period and mixing effects in the processing line.

It will be appreciated that the waste stream profile will vary depending upon the particular PSA system employed, including the adsorbent material used, the number of adsorbent beds employed, the particular PSA processing sequence employed, the cycle time and the like. Apart from said unload portions of the cycle, it should be noted that the oxygen concentration of the waste will generally be high during the early portion of the desorption step.

Given a maximum acceptable oxygen concentration in the recovered waste stream, the optimal time duration for recovering enriched nitrogen product gas can readily be determined. In an illustrative example based on the two bed system of FIG. 1, and for instance, if the maximum acceptable purity were 8% oxygen, it was determined that after about 11 seconds of the about 27 second regeneration step in one bed, the waste stream would have an oxygen concentration of 8% or less. In such example, this state would continue, and nitrogen product gas would be captured, until the start of the unload step, i.e. pressure equalization between the beds. At this point, the waste gas would be vented as in conventional PSA operations. In this regard, it should be emphasized that the average oxygen purity of the waste gas recovered from the PSA system as nitrogen enriched product will obviously be less than the maximum acceptable level.

As suggested above, the optimal time increments for recovery of high purity or enriched nitrogen product can be determined from such a waste stream purity Profile graph for any given PSA-oxygen system of the type described above. The optimal time increment will, of course, change with changes in the PSA processing sequence and with changes in the cycle step times. In general, if the time increments all changed by an equal percentage, it would be expected that the duration for recovering the waste gas as said enriched nitrogen product would change by the same percentage. In all cases, the exact time increments would be determined by instantaneously monitoring the waste gas purity as described above.

For the same maximum allowable oxygen concentration, the time increment for recovering the nitrogen product gas may be longer or shorter depending on the particular features of any given PSA-oxygen system. Furthermore, the time increment may occur at a different point in the PSA processing sequence of one PSA system and process than of another. The optimal recovery period will be a function of the particular adsorbent, cycle sequence and step time increments used in a particular PSA system.

In the particular illustrative example based on the FIG. 1 embodiment, using an adsorption, regeneration, and repressurization cycle, the average oxygen concentration of the waste gas from the PSA beds will typically be in the range of 8-11%. By recognizing that the instantaneous purity of the waste stream varies during its production and by recovering only a specific portion of the waste gas stream, a higher purity nitrogen stream, i.e. one with a lower oxygen concentration, can be obtained. For instance, in the example above, the average purity of the nitrogen product obtained can be enhanced, i.e. by lowering the average oxygen concentration to about 7.5%, by recovering only that portion of the PSA waste gas that contains 8oxygen or less.

A two bed PSA nitrogen system adapted for the practice of the invention is shown in FIG. 2. Feed air in line 50 passes through valve 51 and line 52 to air compressor 53. Compressed air therefrom is passed through line 54 to line 55 containing valve 56 for passage into PSA bed 57. Said bed, as in the FIG. 1 embodiment, contains adsorbent material capable of selectively adsorbing nitrogen as the more readily adsorbable component of feed air, while allowing oxygen (i.e. oxygen and argon) to pass through as the less readily adsorbable component of said feed air. Thus, an enriched oxygen stream passes from bed 57 through line 58 containing valve 59 for passage into storage vessel 95. If the pressure in said storage vessel 95 reaches a pre-determined level, control valve 60 in line 61 opens to allow gas to vent to waste, e.g. to the atmosphere.

Following such feed-adsorption step at the upper adsorption pressure, bed 57 is copurged from the feed end of the bed using high purity nitrogen. For this purpose, nitrogen flows from storage tank 98 through lines 62 and 63, valve 64 and line 52 to compressor 53, from which nitrogen gas enters vessel 57 through valve 56. Enriched oxygen is thereby displaced from the bed and continues to exit from the opposite end of the bed and enters either storage vessel 95 or vents through line 61 and valve 60.

During such adsorption and copurge steps in bed 57, the other bed, i.e. bed 65, undergoes the regeneration portion of the overall PSA cycle. Thus, enriched nitrogen is withdrawn from bed 65 through line 66 and valve 67 and is passed through line 68 to vacuum pump 69. From this pump, the nitrogen either passes through line 70 to storage vessel 98 or travels through line 71 to compressor 72 where it is compressed and sent to the end user through line 73. Near the completion of the regeneration, a small quantity of enriched oxygen produced in bed 57 is passed through line 74 and valve 75 into bed 65 as purge gas to enhance the regeneration thereof.

Following the copurge step, bed 57 undergoes a countercurrent depressurization or blowdown step. Gas leaves the bed through line 76 and valve 77, and passes through line 78 and valve 79, for passage through line 62 to storage tank 98. During this time, a small portion of the gas travels through vacuum pump 69 to prevent dead-ending the pump. Simultaneously, bed 65 undergoes a repressurization step with enriched oxygen. For this purpose, gas flows from storage vessel 95 through line 74 and valve 75 into the top of the bed. Additionally, compressor 53 is unloaded. Air enters the compressor through valve 51 and line 52. Compression occurs to a slightly elevated pressure, and the thus compressed air is vented through line 96 and valve 97.

Once this step interval is finished, one-half of the processing cycle sequence is complete. Bed 57 then begins an evacuation and backfill sequence, while bed 65 undergoes the adsorption, with feed air being passed through line 54 to line 66 containing valve 100 for passage to PSA bed 65, followed by copurge and blowdown portions of the particular processing sequence employed in the PSA-nitrogen operations. This particular cyclic sequence enables a continuous, high purity nitrogen stream to be produced at an elevated pressure. Oxygen gas is meanwhile vented to the atmosphere in conventional practice. In accordance with the practice of the invention, however, the oxygen stream can be fractionated to capture the portion thereof that contains the highest concentration of said oxygen, thereby producing a high purity, enriched oxygen stream in a manner similar to that described above with respect to a PSA-oxygen system.

In the PSA-nitrogen system of FIG. 2, valve 80 allows a portion of the oxygen-containing waste stream to be directed to the end user, while valve 81 enables the net waste gas to be vented. Purity analyzer 82 monitors the instantaneous purity of the waste stream in line 83, through input signal 84. The recovered high purity oxygen stream having a maximum acceptable nitrogen concentration is passed through valve 80 and line 85 to storage tank 86, from which a continuous flow of high purity oxygen is passed to compressor 87 and supplied through line 88 to the end user. Control system 89 controls the operation of valves 80 and 81 by monitoring the oxygen level in storage tanks 95 and 86 by means of input signals 90 and 91, respectively, and the instantaneous waste purity by means of input signal 92 from purity analyzer 82, which monitors said instantaneous waste purity in storage tank 86 by means of input signal 99, and by sending output signals 93 and 94 to said valves.

When the oxygen concentration of the waste gas is above a minimum level, i.e. the nitrogen concentration does not exceed a maximum allowable amount, control system 89 closes valve 81 and opens valve 80. The enriched oxygen gas flows to storage tank 86. As in the FIG. 1 embodiment, it is preferred that this storage tank be a variable volume bladder rather than a fixed volume tank. Compressor 87 continually withdraws a constant quantity of gas from said storage tank 86, compresses it to the required use pressure and supplies this gas to the end user through line 88. When purity analyzer 82 senses that the oxygen purity has fallen below its minimum acceptable level, control system 89 closes valve 80 and opens valve 81 so as to enable the gas to be discharged through line 83 as a net waste of the system.

As in the FIG. 1 embodiment, whenever variable volume tank 86 reaches its maximum volume, or a fixed volume storage tank reaches its maximum oxygen storage, a portion or all of the PSA waste will not be captured even though its oxygen purity is above the minimum acceptable oxygen level. In this case, input signal 91 to control system 89 will over-ride purity signal 84 to purity analyzer 82 and close valve 80 to preclude the passage of additional high purity oxygen to storage tank 86. At this point, valve 81 opens to vent the PSA waste from the system.

It should be noted that there are time intervals in which waste gas is neither flowing through valve 81 or valve 80. This occurs whenever storage tank 95 is below the pressure setpoint at which valve 60 opens in response to signal 90 from said storage tank 95 to control system 89.

As with the PSA-oxygen systems illustrated by the FIG. 1 embodiment, the control system can monitor the purity of gas in storage tank 86 as opposed or in addition to the instantaneous purity of the gas from the PSA beds. If the tank purity is above the minimum acceptable oxygen purity, more waste gas is recovered by increasing the amount of time in which valve 80 is open, while reducing the time during which valve 81 is open. Once again, the purity signal can be overridden by signal 91. Furthermore, as with the PSA-oxygen system, the control system can be set with preset time increments depending on the purity profile for a given PSA-nitrogen system and processing sequence therein.

In the illustrative PSA-nitrogen system of FIG. 2, enriched oxygen gas production begins at the end of the feed air step and continues throughout the entire nitrogen copurge step. A purity profile graph for this system shows that the oxygen concentration rises from air quality (21%) to over 85% oxygen and then back to 21%. The highest oxygen concentration is produced during the copurge step. The sharp fluctuation observed in the oxygen concentration enables a high purity oxygen stream to be recovered in the practice of the invention.

Once the minimum oxygen concentration is determined, the optimal time for recovering the high purity oxygen stream from the net waste can be determined. For instance, if a cutoff of 82% oxygen were desired, the waste stream could be recovered as high purity oxygen in the illustrative example for approximately 15 seconds during the copurge step. Those skilled in the art will appreciate that the critical time in which high purity oxygen is recovered can be readily verified during the process, by appropriately monitoring either the instantaneous waste purity or the purity of storage vessel 86.

The optimal time to recover the waste gas will, of course, vary depending on the particular PSA-nitrogen system employed, and the processing sequences carried out therein. For the same minimum allowable oxygen concentration, the time increment for recovering the desired gas may be longer or shorter depending on such conditions, and the point at which the high purity oxygen is recovered may occur at a different point in the pressing sequence. The optimal recovery period will again be a function of the particular adsorbent, PSA cycle sequence and step time increments employed.

The benefits of the invention can be appreciated by considering the average waste purity of the PSA process as compared to that of the waste purity of the high purity oxygen product captured in the illustrative embodiment of the PSA-nitrogen system of FIG. 2. In the illustrative example, the average oxygen purity of the waste stream was below 60%. Through appropriate sequencing of control valves in the practice of the invention, an enriched oxygen stream having an oxygen purity of 80% or more can readily be recovered.

It will be understood that various changes and modifications can be made in the details of the invention without departing from the scope of the invention as set forth in the appended claims. Thus, any commercially available adsorbent capable of selectively adsorbing either nitrogen or oxygen from feed air can be employed. Equilibrium-type adsorbents, such as zeolitic molecular sieve materials, e.g. 13X, 5A, 10X and mordenite, can thus be employed, and will selectively adsorb nitrogen as the more readily adsorbable component of feed air. Rate selective adsorbent materials, such as carbon molecular sieves, capable of selectively adsorbing oxygen from feed air can also be employed. It will also be appreciated that the particular PSA processing sequence employed can be varied as is generally known in the art. While the general adsorption/desorption/repressurization sequence will pertain to the PSA operation, various other processing steps can also be employed as part of the processing sequence, as is known in the PSA art. Thus, the PSA-oxygen sequence may comprise a sequence such as (1) adsorption at upper adsorption pressure, (2) concurrent depressurization with release of gas from the non-feed end of the bed, with said gas being used for providing purge gas to another bed; (3) concurrent depressurization-pressure equalization; (4) countercurrent depressurization with release of gas from the feed end of the bed, depressurizing the bed to a lower desorption pressure, including such depressurization to a subatmospheric pressure under vacuum conditions; (5) purge at the lower desorption pressure; (6) partial repressurization by pressure equalization; and (7) further repressurization to upper adsorption pressure with feed air. A particular PSA-nitrogen sequence is that of the Werner et al. patent, namely U.S. Pat. No. 4,599,094, comprising: (1) introducing coproduct effluent gas from another bed to the discharge end of the bed, to increase the pressure to an intermediate level; (2) further repressurization with feed air to the upper adsorption pressure; (3) passing more readily adsorbable nitrogen to the feed end of the bed at said upper adsorption pressure as cocurrent purge; (4) countercurrently depressurizing the bed to an intermediate pressure by discharging more readily adsorbable nitrogen from the feed end of the bed; (5) further countercurrently depressurizing the bed to a subatmospheric desorption pressure; (6) countercurrently purging the bed with less readily adsorbable oxygen introduced to the discharge end of the bed, to discharge additional amounts of more readily adsorbable nitrogen from the feed end of the bed; and (7) repeating steps (1)–(6) on a cyclic basis with additional quantities of feed air being passed to the bed during said step (2).

It will be understood that the invention can be practiced in adsorption systems having at least one adsorbent bed, preferably in systems having from two to four adsorbent beds, more preferably two or three adsorbent beds.

The invention will be seen to enhance the benefits of PSA-air separation operations in practical commercial operations. BY enabling dual product recovery, the invention significantly advances the technical and economic feasibility of employing PSA-air separation processes and systems in applications wherein high purity oxygen and nitrogen are advantageously employed.

We claim:

1. In a pressure swing adsorption process for the recovery of either oxygen or nitrogen product in an adsorption system having at least one adsorbent bed containing adsorbent material capable of selectively adsorbing either oxygen or nitrogen as a more readily adsorbable component of feed air, said process comprising, on a cyclic basis in each bed, an adsorption/desorption/repressurization sequence in which a desired product is recovered from the system and a waste stream is discharged from said system, the improvement comprising:
   (a) separating a portion of the waste stream from a net waste portion thereof, the portion separated having a non-product component purity higher than the average purity level of said component in the waste stream, said purity level being at least equal to a minimum acceptable level desired for said non-product component;
   (b) passing the separated portion of the waste stream from the system as a high purity second product; and
   (c) discharging said net waste portion from the system, whereby high purity oxygen and nitrogen streams are both recovered, such dual product recovery enhancing the overall air separation operation.

2. The process of claim 1 in which the more readily adsorbable component comprises nitrogen and oxygen is a less readily adsorbable component of feed air.

3. The process of claim 2 in which oxygen is the desired product, with high purity nitrogen comprising the second product.

4. The process of claim 2 in which nitrogen is the desired product, with high purity oxygen comprising the second product.

5. The process of claim 1 and including monitoring the instantaneous purity of the waste stream, with said waste stream being separated from the net waste whenever its purity meets or exceeds said minimum acceptable level.

6. The process of claim 5 in which oxygen is the desired product.

7. The process of claim 6 in which said adsorbent material comprises zeolitic molecular sieve material capable of selectively adsorbing nitrogen as the more readily adsorbable component of feed air.

8. The process of claim 5 in which nitrogen is the desired product.

9. The process of claim 8 in which said adsorbent material comprises zeolitic molecular sieve material capable of selectively adsorbing nitrogen as the more readily adsorbable component of feed air.

10. The process of claim 1 in which the separated portion of the waste stream passes to a storage tank, with the purity of the separated portion of non-product component in the storage tank being monitored and said separated portion of the waste stream passing to said storage tank for the period of time during which the purity of said separated portion of non-product component meets or exceeds said minimum acceptable level.

11. The process of claim 10 in which said more readily adsorbable component comprises nitrogen and the less readily adsorbable component comprises oxygen.

12. The process of claim 11 in which oxygen is the desired product, with high purity nitrogen comprising the second product.

13. The process of claim 11 in which nitrogen is the desired product, with high purity oxygen comprising the second product.

14. The process of claim 1 and including presetting the time increments during which a portion of the waste stream is separated from the net waste so that said separated portion of the waste stream has a purity that meets or exceeds said minimum acceptable level.

15. The process of claim 14 in which said adsorbent material comprises zeolitic molecular sieve material capable of selectively adsorbing nitrogen as the more readily adsorbable component of feed air.

16. The process of claim 15 in which oxygen is the desired product.

17. The process of claim 15 in which nitrogen is the desired product.

18. The process of claim 1 and including passing the separated portion of the waste stream to a storage tank, monitoring the amount of said separated portion of the waste stream passed to the storage tank, and diverting additional amounts of the waste stream for discharge when said storage tank is filled with said separated portion of the waste stream.

19. In a pressure swing adsorption system for the recovery of either oxygen or nitrogen product in an adsorption system having at least one adsorbent bed containing adsorbent material capable of selectively adsorbing either oxygen or nitrogen as a more readily adsorbable component of feed air, said system being adapted for operation of a processing sequence comprising adsorption, desorption and repressurization in which a desired product is recovered from the system and a waste stream is discharged from said system, the improvement comprising:

(a) control means for separating a portion of said waste stream from a net waste portion thereof, the portion separated having a non-product component purity higher than the average purity level of said component in the waste stream, said purity level being at least equal to a minimum acceptable level established for said non-product component;

(b) conduit means for passing the portion of the non-product component separated from the system as a high purity second product; and (c) conduit means for discharging the net waste portion from the system; whereby high purity oxygen and nitrogen streams are both recovered, such dual product recovery enhancing the overall air separation operation.

20. The system of claim 19 in which said adsorbent material is capable of selectively adsorbing nitrogen as the more readily adsorbable component of feed air.

21. The system of claim 19 and including analyzer means for monitoring the instantaneous purity of the waste stream, and control means for separating said portion of the waste stream from the net waste stream whenever its purity meets or exceeds said minimum acceptable level.

22. The system of claim 21 in which said desired product comprises oxygen.

23. The system of claim 21 in which said desired product comprises nitrogen.

24. The system of claim 21 in which said adsorbent material comprises zeolitic molecular sieve material capable of selective adsorbing nitrogen as the more readily adsorbable component of feed air.

25. The system of claim 21 in which said adsorption system comprises two to four adsorbent beds.

26. The system of claim 19 and including (1) a storage tank for said separated portion of the waste stream, (2) conduit means for passing said separated portion the storage tank, (3) analyzer means for monitoring the purity of the separated portion of non-product component in said storage tank, and (4) control means for passing said separated portion of the waste stream to said storage tank for the period of time during which the purity of the separated portion of non-product component meets or exceeds said minimum acceptable level.

27. The system of claim 26 in which said more readily adsorbable component of feed air comprises nitrogen.

28. The system of claim 27 in which the desired product is oxygen.

29. The system of claim 27 in which the desired product is nitrogen.

30. The system of claim 26 in which said adsorption system comprises two adsorbent beds.

31. The system of claim 19 and including control means for presetting the time increments during which a portion of the waste gas is separated from the net waste, such that said separated portion of the waste stream has a purity that meets or exceeds said minimum acceptable level.

32. The system of claim 31 in which said adsorbent material comprises zeolitic molecular sieve material capable of selectively adsorbing nitrogen as the more readily adsorbable component of feed air.

33. The system of claim 31 in which said adsorption system comprises two to four adsorbent beds.

34. The system of claim 33 in which said adsorption system comprises two adsorbent beds.

35. The system of claim 19 and including (1) conduit means for passing the separated portion of the waste stream to a storage tank, (2) monitoring means for determining the amount of said separated portion of the waste stream passed to the storage tank, and (3) control means for diverting additional amounts of said waste stream for discharge when said storage tank is filled with said separated portion of the waste stream.

36. The system of claim 19 in which said adsorption system comprises from two to four adsorbent beds.

37. The system of claim 36 in which said adsorption system comprises two adsorbent beds.

* * * * *